Jan. 22, 1935.  I. R. DANUFF ET AL  1,988,868

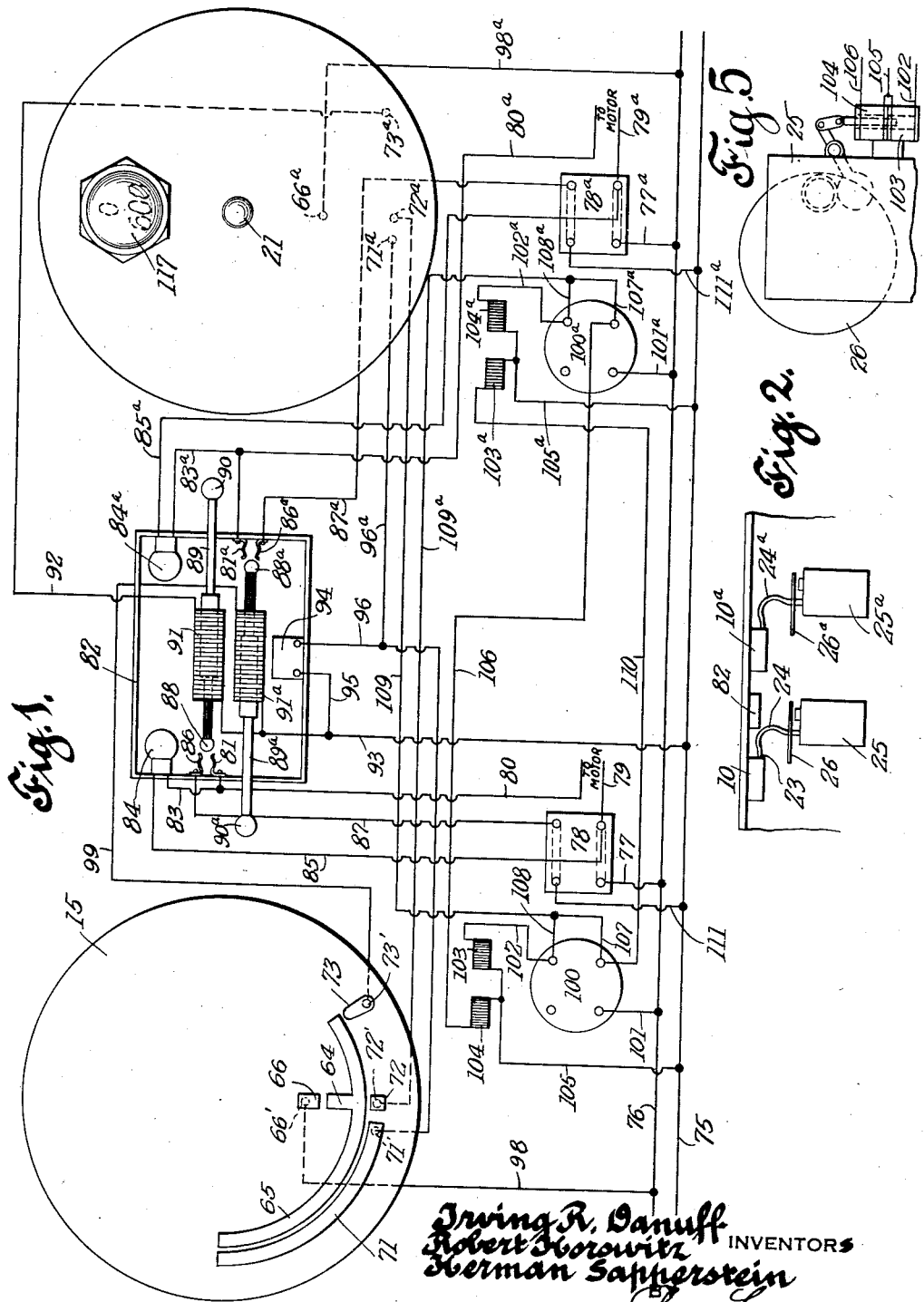

AUTOMATIC FILM CUING DEVICE

Filed Oct. 13, 1930  2 Sheets-Sheet 2

Irving R. Danuff
Robert Horowitz
Herman Sapperstein
INVENTORS

BY Percy Freeman
ATTORNEY

Patented Jan. 22, 1935

1,988,868

UNITED STATES PATENT OFFICE 1,988,868

AUTOMATIC FILM CUING DEVICE

Irving R. Danuff and Robert Horowitz, Bronx, and Herman Sapperstein, Brooklyn, N. Y.

Application October 13, 1930, Serial No. 488,372

5 Claims. (Cl. 88—17)

This invention relates to improvements in devices for automatically indicating the number of feet remaining on a constantly diminishing projector reel, for silent and sound motion pictures, and also the proper time to change from a film exhausted projector to another having a continuing length of film on its dispensing reel.

In the exhibition of motion pictures it is frequently necessary to change from one projector to another and it is obviously desirable to effect such change smoothly and uninterruptedly, and particularly so that no break occurs in the continuity of their display.

When the film is used in different theatres, or repeated many times, it usually becomes shortened by reason of cutting out imperfections, scratches, torn spots, and marks put on by different operators, so that the proper moment for making the change is difficult to ascertain.

The present invention has as one of its objects to provide an apparatus whereby a film of any predetermined length, which may be indicated on a dial, is caused to show the decrease in running feet of film as it is displayed and the exact moment when the change from one projector to another should be made.

A further feature is in the provision of means for automatically switching one projector into service, concurrently with stopping another, at exactly the right moment, thereby producing perfect continuity of film display and sound, without the intervention of personal attendance.

Other advantageous objects will appear as the description proceeds all being accomplished by the novel construction and arrangement of parts as hereinafter described and shown in the accompanying drawings, forming an important part of this disclosure, and in which:

Fig. 1 is a diagrammatic view illustrating the principal features of the invention and their electrical connections.

Fig. 2 is a fragmentary view of similar nature, showing a pair of projectors as arranged for progressive operation.

Fig. 5 is a detail view of the changeover shutter control.

Figure 3:
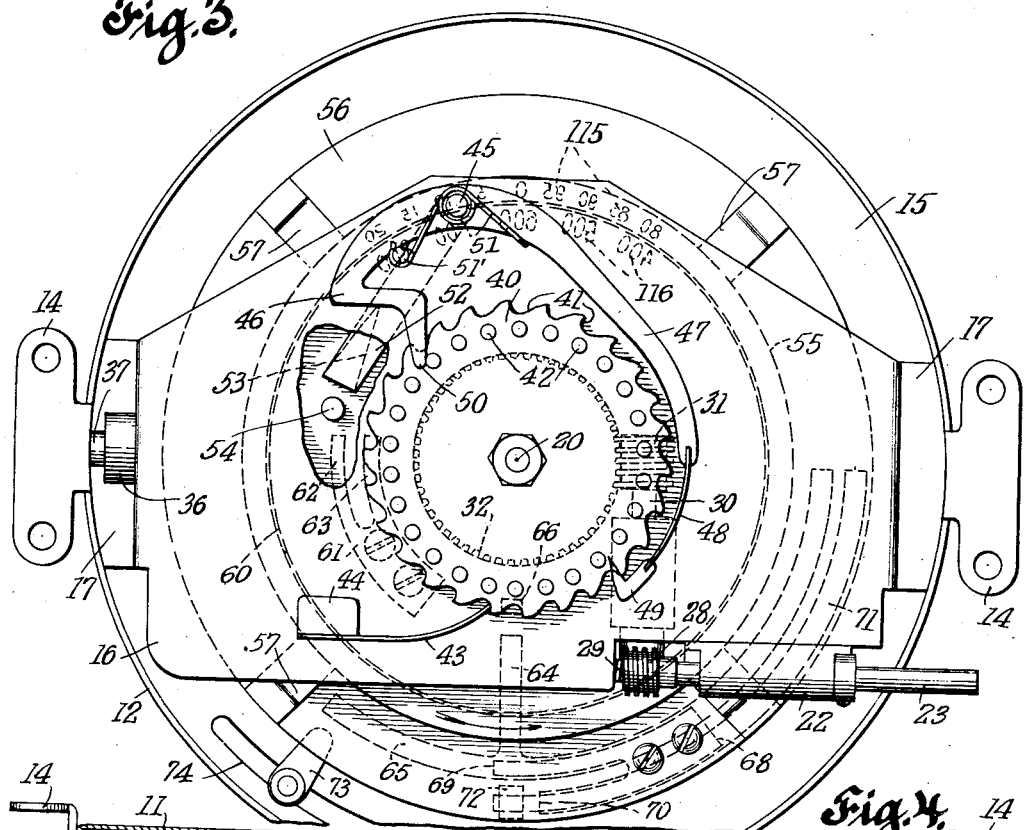
Fig. 3 is a bottom plan view of one of the dials and actuating mechanism.
Figure 4:
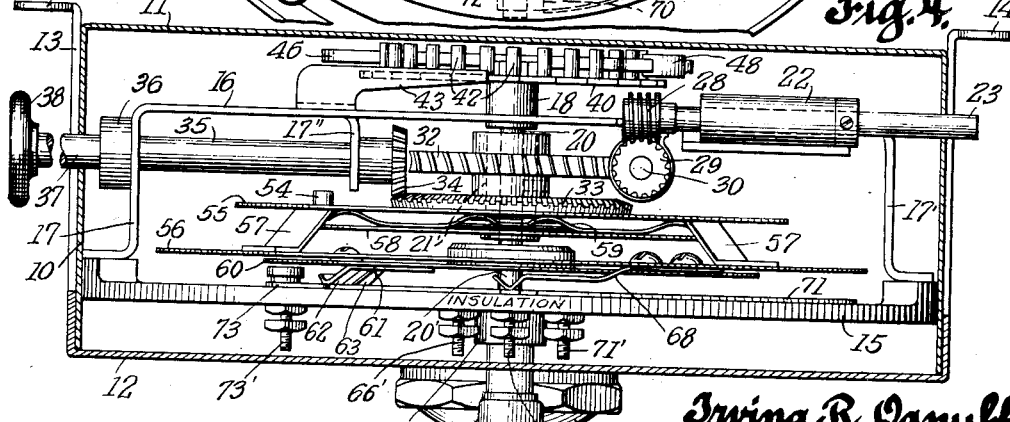
Fig. 4 is a transverse sectional view of the same.

The dials and their driving means, sometimes called clocks, are enclosed in a casing 10 having cylindrical side walls, an imperforate bottom 11 and a cover 12, which is disposed over the side wall edges, continues in the form of a pair of opposed narrow strips 13 downwardly and terminates in outstanding flanges 14 which may be secured to a support.

Fixed in the casing 10 is a dielectric plate 15, below which is a plate bracket 16 having right angled support arms 17—17' extending to the plate 15, which is spaced parallel with the cover.

Fixed in the bracket 16 is a collar 18, and revoluble in the collar is a spindle 20, extending outwardly through the cover 12, where it is provided with a twirling knob 21, connected by a one way clutch 19, the spindle being arranged axially of the casing, and mounted on the spindle is a sleeve 21 the purpose of which will later appear.

An auxiliary bracket 22 is carried on the leading edge of the plate bracket and journalled in the bracket 22 is a spindle 23, connected by a flexible shaft 24, see Fig. 2, with a picture projector 25 complete, including a flicker shutter 26 on the shaft 24.

Fixed on the inner end of the spindle 23 is a worm 28, in mesh with the teeth of a worm gear 29 rigid on a spindle 30 and having on its inner end a worm 31 meshing with a worm wheel 32 provided with a hub fixed on the sleeve 21' to impart rotary motion to it.

Rotatably mounted on the sleeve 21', adjacent the worm gear, is a bevel gear 33 meshing with a bevel pinion 34 secured on a spindle 35, parallel to the spindle 23, but on the opposite side of the axis of the apparatus.

The spindle 35 is carried in bearings formed in the arm 17 of the bracket 16, and adjacent the arm 17 and an inner arm 17'' is a one-way clutch 36 by which is engageable a spindle 37 extending outwardly beyond the casing 10 and provided with an operating knob 38.

Fixed on the extreme inner end of the spindle 20 is a disc 40 having a plurality of ratchet teeth 41 in its periphery and on its upper surface is a row of pins 42 adjacent the bottoms of the teeth.

A spring detent 43 is anchored at 44 on the bracket 16, its forward, inbent end engaging the teeth of the disc preventing the disc from reverse rotation.

A pin 45, mounted in the bracket 16, has attached to its upper end an escapement of peculiar design composed of two arms 46—47, the latter having set in its free end a flat spring 48 carrying a hook 49 operatively engageable with the teeth 42 on the disc; the other arm 46 is offset inwardly and provided with a curved terminal 50 entrable in the manner of a detent between any two adjacent pins, being normally held in this position by the action of a double ended spring 51 coiled about the pin and limited by a stop 51'.

Fixed to the lower portion of the pin 45, is a rigid arm 52 having a cam 53 on its under portion, set by the spring 51 to extend normally into the path of a pin 54 fixed in the under face of a disc 55 concentric with the gear 33 and close against its outer surface.

A flat ring 56 is concentrically superposed over the disc 55, being held in spaced relation by a plurality of clips 57 extending between them.

A disc 58, carried by the sleeve 21', has on its under surface an undulated flat spring 59 frictionally engaging the disc 55, and pressing it into engagement with the bevel gear 33.

Closely adjacent the ring 56, towards the front of the casing, is another disc 60, carrying a spring contact 61 having its free, outwardly bent end bifurcated to produce arms 62—63 which is adapted to engage an arm 64 extending inwardly from a fixed arcuate contact 65 secured on the under side of the dielectric plate 15.

Directly in register with the fixed arm 64, at a point towards the center and spaced from the end of the arm, is a fixed contact 66, these contacts 64—66 being bridged by the movable spring contact arms 62—63 when passed thereover.

Another similar spring contact 68 having a pair of arms 69—70, is secured to the plate ring 56 one of its arms 69 being engageable with the arcuate contact 65 and the other arm 70 with a similar but shorter arcuate contact 71 fixed concentrically outward beyond the contact 65 to the dielectric plate 15.

Adjacent one end of the arcuate contact 71, in register with the arm 64, is a short contact 72 fixed on the plate 15.

The contact 72 is provided with a binding screw 72', the arcuate contact 71 with a similar binding screw 71' and the fixed contact 66 with a like binding screw 66' for the attachment of electric connections.

Another binding screw 73' is provided for a motor starting switch 73, and is adjustably clamped in an arcuate slot 74 in the dielectric plate 15, the switch element 73 being disposed in the path of the spring contact arm 70, as is also the fixed contact 72 and arcuate contact 71.

The electrical diagram, shown in Fig. 1, will now be considered: a positive and negative electrical current from any convenient source is provided by conductors 75—76, the latter having a branch 77 leading to a switch 78 controlling an electric motor 79 for one of the projectors 25, return current passing through conductor 80 to a contact 81 within a controller 82.

A branch 83 of the conductor 80 leads to one terminal of an electric lamp 84, its other terminal being in circuit with conductor 85 leading back to the motor switch 78.

A contact 86 in the controller 82, mating with contact 81 is connected by conductor 87 with the other pole of the motor switch 78.

The contacts 81—86 are placed in circuit by a conducting knob 88 carried by an armature 89 provided with a manually actuable knob 90, the rod passing through a solenoid 91 in the controller 82.

It will be understood that two of the control devices are used, in all respects alike and therefore but one will be described, the parts of the other being given the same distinguishing symbol with the character A; it will also be seen that in Fig. 1, the apparatus at the left controls the operative mechanism of the apparatus at the right and vice versa.

The solenoid 91 is provided with a current by conductor 92 leading from the motor control switch 73a, return current passing from both solenoids by conductor 93 to main conductor 75.

A buzzer or similar signal 94 in the controller 82 has its returns connected to a branch 95, current entering by conductor 96 connected with the arcuate contact 71, and also by branch 96a with a similar contact in the mating apparatus.

A conductor 98 leads from the contact 66 to the main line 76 and conductor 99 leads from the motor contact 73 to the solenoid 91a.

Change-over foot switches 100—100a receive current through conductors 101—101a from main line 76, the former delivering through conductor 102 to coil 103—104 arranged in series and thence by conductor 105 to line 75.

A conductor 106 connects the coil 104 with the corresponding foot switch 100a, and branches 107—108 from switch 100 connect with conductor 109 leading to contact 72a; in a similar manner branches 107a—108a of switch 100a are united with conductor 109a leading to contact 72.

Another conductor 110 from the foot switch 100 leads to the coils 103a—104a and thence to floor switch 100a. The motor switches 78—78a are provided with conductors 111—111a returning current to the line conductor 75.

Returning now to the mechanical structure of the apparatus, a row of numerals 115, from 0 to 99, representing unitary feet of film appear on the upper surface of the plate ring 56 and another row of figures 116, from 0 to 2500, by increments of 100, are disclosed on the adjacent surface of the disc 60, these numerals showing through an aperture in the cover 12 covered by a lens 117, these elements constituting dials by which the number of feet on the dispensing reel may be known.

These dials are independently set to the known predetermined length of the film on the reels on the projector to which each instrument is connected, by the knob 21 for the hundreds dial 60, and, as experiment has demonstrated that a lap of several feet must be allowed for the change from one reel to another, in this instance about 12 feet, the dial carrying the contacts 62—63 will be adjusted to indicate 12; it is further to be understood that, as the number of feet on the reels is constantly decreasing, the mechanism operates in accordance, that is by subtracting the number of feet displayed.

The knob 38, through the pinion and gear 33—34, operates the disc 55 and by its connections 57 the outer ring dial 56 is rotated, bringing the contacts 69—70 into proper position. It is to be noted that both knobs 21 and 38 are provided with one way clutches so that reverse movement of either is prevented.

Thereafter the starting switch is adjusted and the apparatus is ready for operation.

The motor shaft 24, driving the flicker shutter 26, is, as has been described, operatively engaged with the spindle 23, driving worm 28, pinion 29, worm 31 and worm wheel 32, which by its connections actuate the disc 40 and pins 42, which, due to the escapement elements, including the cam lever 52 and pin 54 moves intermittently and is held from reverse action by the spring detent 43.

Let it be assumed that one of the reels contains 960 feet of film; the dial 60 will be set at "900" and the dial 56 set at "60"; when the projector actuating these dials and indicating each foot running through the projector, shows on the dial 60, a zero, and the dial 56 reaches the numeral "99" the buzzer 94 will be caused to emit an audible signal which is maintained during the display of the next 25 feet of film to signal the operator to strike the arc of the incoming projector and stand by.

When the dial 56 reaches the signal "12" the contacts will, through their connections, conduct current to the solenoid 91, actuating the armature 88—89, closing the circuit between contacts 81—86, controlling current to the lamp 84 and motor 79.

When the dial 56 reaches the numeral "1", then the change-over foot switch becomes operative, and automatically shuts off light from the outgoing projector and opens the dowser on the incoming projector simultaneously.

Although the foregoing is descriptive of the best known embodiment of the invention, it will be understood that modifications and changes may be made within the scope of the appended claims and that parts may be used aside from others as may be deemed advantageous.

Having thus described the invention and set forth the manner of its construction and application, what is claimed as new and sought to secure by Letters Patent, is:

1. In a motion picture projector change-over apparatus the combination with a pair of projectors, adapted for alternate use, by dowsers on each, of a control apparatus for each projector, revoluble indicating means for setting each control apparatus in accordance with only the length of film to be displayed, and means carried by said indicating means to automatically sequentially to close the circuit to the motor of the incoming projector and effect the change-over by simultaneously opening the dowser on the incoming projector and shutting the dowser on the outgoing projector.

2. In an apparatus for changing from one display film to another, the combination with a pair of projectors, having independent motors, of a separate apparatus to control each motor, rotatable dials driven from the flicker shutter shaft of each projector, and carrying numerals to indicate the decreasing number of feet of film in each projector, said dials being manually settable to the total number of feet of film initially placed in the projector, an electric circuit to each motor, and means carried by said dials to close the circuit to each motor automatically at a predetermined time.

3. In an apparatus for changing from one display film to another, a pair of projectors having independent motors, a separate apparatus to control each motor, dials manually settable to indicate the number of feet of film placed in each projector, an electric circuit to each motor, motor circuit closing means on said dials, and an audible signal contact on said dial operative as the end of the film approaches.

4. In an apparatus for controlling the actuation of a plurality of motion picture projectors a casing for each projector having a plate ring and a disc concentric therein, means for setting said ring and disc independently, means actuated by one of said projectors to transmit constant rotary motion to said ring, means to cause a partial rotation of said disc, at each full revolution of said ring, means for initially setting said ring and disc manually in accordance with the length of film on one of the projectors, means for visually ascertaining the constantly diminishing length of film in feet and multiples thereof, and means carried by said ring and disc for switching the projector motors on alternately and dowsing the opposite projector automatically and whereby the films may be uninterruptedly displayed from each projector in turn.

5. In an apparatus for changing from one display film to another, the combination with a pair of projectors having independent motors, of a separate apparatus to control each motor, rotatable dials driven from a rotating part of each projector, and carrying numerals to indicate the decreasing number of feet of film in each projector, said dials being manually settable to the total number of feet of film initially placed in the projector, an electric circuit to each motor, and means carried by said dials to close the circuit to each motor automatically at a predetermined time.

IRVING R. DANUFF.
ROBERT HOROWITZ.
HERMAN SAPPERSTEIN.